July 7, 1925.
H. L. BREDLOW ET AL
1,544,721
COMBINED BRAKING AND CLUTCHING MECHANISM
Filed May 29, 1924    2 Sheets-Sheet 1
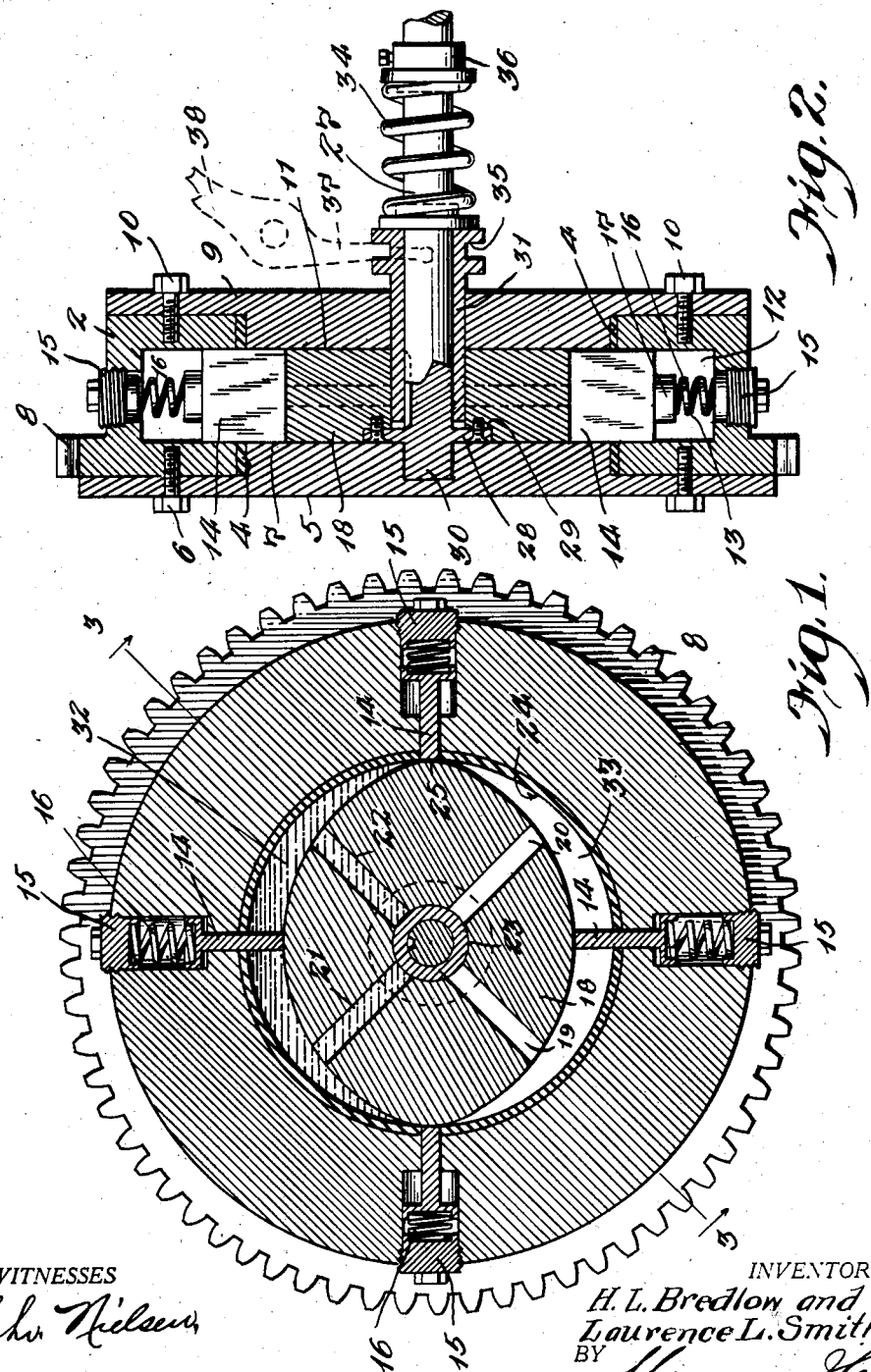
WITNESSES
INVENTORS
H. L. Bredlow and
Laurence L. Smith.
BY
ATTORNEYS July 7, 1925.
H. L. BREDLOW ET AL
1,544,721
COMBINED BRAKING AND CLUTCHING MECHANISM
Filed May 29, 1924     2 Sheets-Sheet 2
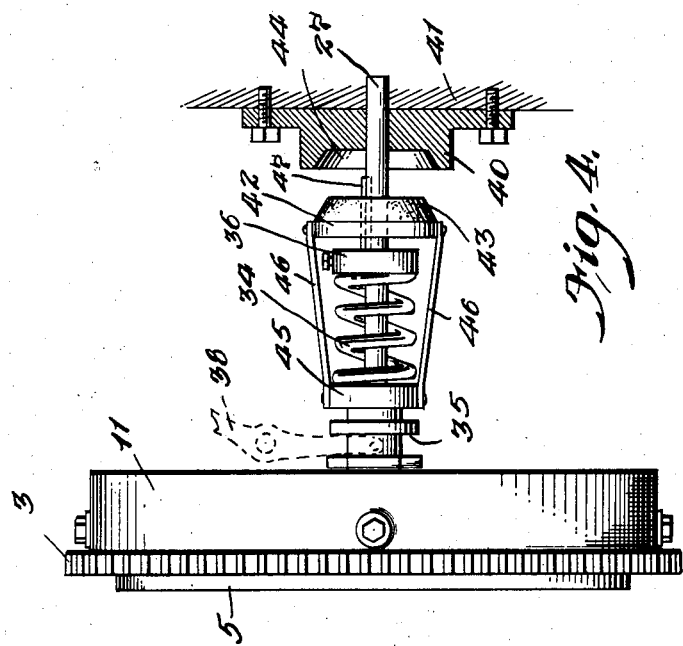
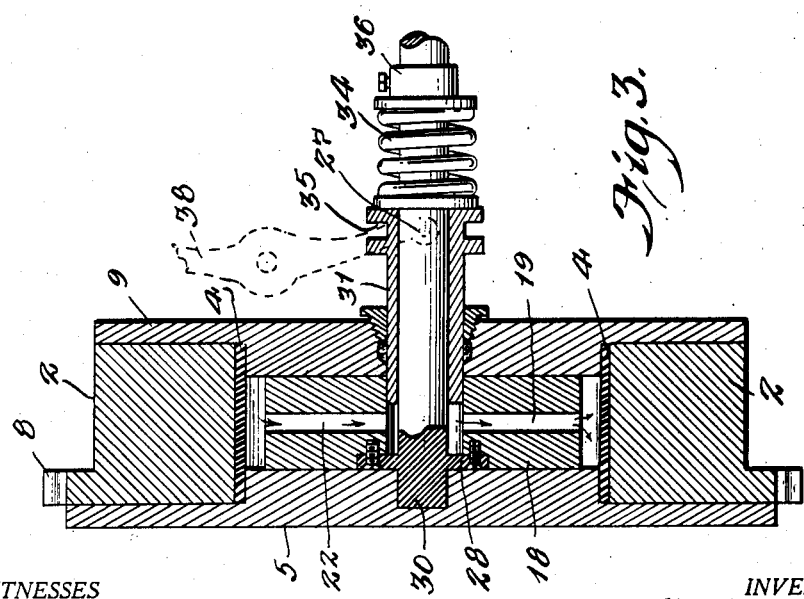
WITNESSES
INVENTORS
H. L. Bredlow and
Laurence L. Smith.
BY
ATTORNEYS Patented July 7, 1925.

1,544,721

UNITED STATES PATENT OFFICE.

HAROLD L. BREDLOW AND LAURENCE L. SMITH, OF WAUSAU, WISCONSIN.

COMBINED BRAKING AND CLUTCHING MECHANISM.

Application filed May 29, 1924. Serial No. 716,736.

*To all whom it may concern:*

Be it known that we, HAROLD L. BREDLOW and LAURENCE L. SMITH, citizens of the United States, and residents of Wausau, in the county of Marathon and State of Wisconsin, have invented certain new and useful Improvements in Combined Braking and Clutching Mechanism, of which the following is a specification.

This invention relates to combined braking and clutching mechanism and has for its object the provision of a device operated as a fluid control clutch and a braking means to prevent rotation of the usual transmission gear when the clutch is out and the gears are being shifted.

A further object of the invention is the provision of a fluid controlled clutch in which a sleeve valve is operated by the usual clutch pedal for controlling the flow of fluid which actuates or permits release of the clutch.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a transverse vertical section of the fluid controlled clutching mechanism.

Figure 2 is a longitudinal vertical section taken at right angles to the section shown in Figure 1 of the fluid controlled clutch.

Figure 3 is a section taken along the line 3—3 of Figure 1.

Figure 4 is a side view of the combined clutch and braking mechanism.

Referring more particularly to the drawings, 1 generally designates a fly wheel in the shape of a ring 2 and having an external gear 3. Mounted on the inner periphery of the ring 2 is a bushing 4 which is of substantially the same width as that of said ring.

A plate 5 is screwed to one face of the ring 2, as shown at 6 and has a circular projection 7 received by the bushing 4. As shown in Figure 2, the diameter of this plate is substantially equal to the diameter of the ring 2 when the teeth 8 of said ring are disregarded and as shown the teeth project beyond the periphery of the plate 5. A plate 9 is secured, as shown at 10, to the other face of the ring 2 and has a circular projection 11 received within the bushing 4.

At spaced intervals or at 90° apart a recess 12 is formed and receives a spring 13 and an oscillating baffle 14. The outer end of the recess is closed by a threaded plug 15 adapted to receive the outer end of a coiled spring 16 while the other end of the spring is received within a socket 17 formed at the outer end of the reciprocating baffle 14. The baffles are adapted to be maintained inwardly by the action of the spring 16 with the inner ends of the baffles always in engagement with a rotor 18. The bushing 4 is provided with spaced slots adjacent the baffles 14 through which said baffles are adapted to reciprocate. Said baffles are more particularly slidable within a complementary slot formed interiorly of the recess 12 and in the ring 2.

The rotor 18 is elliptical in cross section and is provided with a pair of radially disposed grooves 19, 20, 21 and 22 with the grooves 19 and 22 alining while grooves 20 and 21 aline. Consecutive grooves are located at right angles to each other and open within a longitudinal bore 23 formed centrally of the rotor 18.

The rotor is mounted for operation within a chamber 24 bound by the bushing 4 and the side plates 5 and 9 with the circular projections 7 and 11 of these respective plates in engagement with the flat sides of the rotor 18. The major axis of the rotor 18 is of such a length that the ends 25 of said rotor are always in engagement with the bushing 4 while the periphery of the rotor at every 90° is engaged by the reciprocating baffles 14. The chamber 24 is partially filled with oil for a purpose which will be presently described. A drive shaft 27 which is adapted to be connected with the usual transmission gears in the transmission housing has its outer end passing through the plate 9 and the rotor 18 and is provided with a flange 28 mounted within a recess 29 formed in one face of the rotor 18. The free end 30 of the shaft 27 is located within an annular recess in the projection 7 of the plate 5.

A sleeve 31 is slidably mounted on the shaft 7 and is adapted to be normally located between the bore 23 of the rotor 20 and the shaft 27 so that as the bore is moved inwardly to position, as shown in Figure 2, the oil passage 19 will be isolated from the passage 22 and the oil passage 20 will be isolated from the passage 21 and thereby maintain the oil in the upper portion 32 of the chamber 24 while the lower portion 33 of the chamber has a slight quantity of oil. A coil spring 34 located between the grooved collar 35 on the sleeve 31 and a collar 36 rigidly mounted on the shaft 27 is adapted to maintain the sleeve in its innermost position with the inner end in engagement with the annular flange 28 on the shaft 27 and thereby maintaining the ports 21 and 22 closed respectively from the ports 19 and 20.

A fork 37 adapted to receive the grooved collar 35 for oscillating the same is connected to a pivotally mounted foot pedal for oscillating the yoke and for reciprocating the sleeve 31.

The operation of our device is as follows:

The sleeve 31 is adapted to be normally forced inwardly by the spring 34 so that the inner end of the sleeve will be disposed across the central portion of the rotor 18 and thereby close passage 19 from passage 22 and passage 20 from passage 21 so that the elliptical shaped rotor will continue to revolve, that the oil in the chamber 24 will be compressed and maintained in the upper portion 32 of said chamber with the horizontally disposed baffles cooperating with the upper vertically disposed baffles 14 for aiding in placing the oil under pressure, and thus the resistance created by the oil to the movement of the rotor 18 prevents operation of the same and operates as the clutch. As soon as the foot pedal is actuated and the sleeve is withdrawn sufficiently to unclose openings of the radially disposed passages in the rotor 18, the upper passages 21 and 22 will be placed in open communication respectively with the passages 20 and 19 and thereby permit the oil from the upper portion 32 of the chamber 34 to flow through these passages to the lower chamber and thereby permit rotation of rotor 18 independently of the fly wheel which is generally indicated by the numeral 1.

When it is desired to check rotation of the shaft 27 during the time when the clutch is out we employ a braking mechanism which is adapted to maintain the shaft 27 against rotation and thereby stop rotation of the gears so that when the gears are shifted the teeth of the same will not be ripped or injured.

A clutching member 40 is rigidly secured to the wall 41 of the transmission housing and is provided with a central bearing in which the shaft 27 revolves. Slidably mounted on the shaft 27 is a cooperating clutching member 42 having a leather face 43 adapted to be received within the socket 44 of the member 40 when the sleeve 31 is moved outwardly by the shifting of the lever 38 to release the usual clutch of the automobile. A collar 45 mounted on the shaft 27 is engaged at one end by the coil spring 34 and at its other end by collar 36 and is adapted to normally maintain the clutch member 42 out of engagement with the clutch member 40. The collar 45 is connected to the clutch member 42 by means of the links 46.

A key 47 on the shaft 27 is adapted to lock the clutching member 42 with the shaft 27 to permit sliding movement of the clutch member on said shaft.

As has been explained, when the clutch is thrown out or when the rotor 18 is so positioned that the oil from chamber 32 is permitted to enter the portion 33 of the chamber 24, the clutch member 42 is moved into the socket 44 of the clutch member 40 and thereby locking the shaft 27 against rotation and thus preventing rotation of the gears and transmission so that the gears may be normally shifted without injury to the gears.

What we claim is:

1. A clutch mechanism comprising a fly wheel having a chamber therein partially filled with oil, a rotor in the chamber and provided with a central bore, vanes mounted radially in the fly wheel and adapted to engage the rotor and cooperate with the rotor for dividing the chamber into a plurality of compartments, the rotor being provided with radially disposed passages in communication with each other by the bore in the rotor, and a sleeve movable into the bore for isolating the passages from each other.

2. A clutch mechanism comprising a fly wheel having a chamber therein partially filled with oil, a rotor in the chamber and provided with a central bore, vanes mounted radially in the fly wheel and adapted to engage the rotor and cooperate with the rotor for dividing the chamber into a plurality of compartments, the rotor being provided with radially disposed passages in communication with each other by the bore in the rotor, a sleeve movable into the bore for isolating the passages from each other, and a drive shaft connected to the rotor for operating the same.

3. A clutch mechanism comprising a fly wheel having a chamber therein partially filled with oil, a rotor in the chamber and provided with a central bore, vanes mounted radially in the fly wheel and adapted to engage the rotor and cooperate with the rotor for dividing the chamber into a plurality of compartments, the rotor being provided with radially disposed passages in communication with each other by the bore in the rotor, a sleeve movable into the bore for isolating the passages from each other, and a drive shaft connected to the rotor for operating the same, said sleeve being slidable on the shaft, with the shaft mounted in the bore but spaced from the walls of the bore.

4. A clutch mechanism comprising a fly wheel having a chamber therein partially filled with oil, a rotor in the chamber and provided with a central bore, vanes mounted radially in the fly wheel and adapted to engage the rotor and cooperate with the rotor for dividing the chamber into a plurality of compartments, the rotor being provided with radially disposed passages in communication with each other by the bore in the rotor, a sleeve movable into the bore for isolating the passages from each other, a drive shaft connected to the rotor for operating the same, and resilient means for maintaining the vanes in engagement with the rotor.

5. A clutch mechanism comprising a fly wheel having an oil chamber therein partially filled with oil, a rotor in the chamber having diametrically disposed projections in engagement with the wall of the chamber, vanes mounted radially in the fly wheel adapted to engage the periphery of the rotor, said rotor being provided with passages connecting the opposite portions of the chamber which are isolated from each other by the projections on the rotor, and means manually operable for closing the passages and isolating the sections of the chamber from each other.

6. A clutch mechanism comprising a fly wheel having a chamber therein partially filled with oil, a rotor elliptical in cross section in the chamber and having a central bore, the opposite ends of the rotor where the major axis of the elliptical rotor terminates engaging the walls of the chamber for separating the chamber into opposite compartments, vanes mounted in the fly wheel and engaging the rotor, said rotor being provided with passages adapted to diametrically connect the spaces in the chamber located diagonally opposite each other and between pairs of the vanes, and means for controlling the flow of oil through the passages and for isolating the various compartments in the chamber from each other.

7. In a clutch mechanism, a fly wheel comprising a ring, plates forming closures for the opposite ends of the ring, said plates being provided with inwardly projecting cylindrical members, an annular bushing seated on the inner periphery of the ring and having its edge portion located between the inner wall of the ring and the outer periphery of the cylindrical projections, said cylindrical projections being spaced from each other to form a chamber in the fly wheel.

8. A combined clutch and braking mechanism comprising in combination a fly wheel, a clutch member, a drive shaft connected with the clutch member, a shiftable means for causing the clutch member to engage the fly wheel for simultaneous rotation, a second clutch member keyed to the shaft but slidable thereon, a cooperating clutch member adapted to be engaged by the second clutch member for locking the shaft against rotation when the first clutch member is disengaged from the fly wheel.

HAROLD L. BREDLOW.
LAURENCE L. SMITH.